(12) United States Patent
Lee et al.

(10) Patent No.: US 7,756,195 B2
(45) Date of Patent: Jul. 13, 2010

(54) DEMODULATOR AND DEMODULATING METHOD FOR WPAN

(75) Inventors: U Sang Lee, Hwaseong (KR); Sang Hyun Min, Yongin (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 501 days.

(21) Appl. No.: 11/822,843

(22) Filed: Jul. 10, 2007

(65) Prior Publication Data

US 2008/0008230 A1   Jan. 10, 2008

(30) Foreign Application Priority Data

Jul. 10, 2006   (KR) ............... 10-2006-0064414

(51) Int. Cl.
    *H04B 1/00* (2006.01)
(52) U.S. Cl. ................................. 375/150
(58) Field of Classification Search .......... 375/148, 375/150, 316, 324–325, 330, 342–343; 329/304
    See application file for complete search history.

(56) References Cited

U.S. PATENT DOCUMENTS

| 5,960,045 | A   |   | 9/1999  | Duponteil et al. |         |
|-----------|-----|---|---------|------------------|---------|
| 6,108,317 | A   | * | 8/2000  | Jones et al.     | 370/320 |
| 6,304,136 | B1  | * | 10/2001 | Rabii            | 329/300 |
| 6,487,260 | B1  | * | 11/2002 | Schweickert et al. | 375/343 |
| 6,601,078 | B1  |   | 7/2003  | Bondarowicz et al. |       |
| 7,643,579 | B2  | * | 1/2010  | Min et al.       | 375/325 |

FOREIGN PATENT DOCUMENTS

| JP | 2002-009672    | 1/2002 |
| KR | 1999-0065545   | 8/1999 |
| KR | 10-2006-0079741| 7/2006 |
| KR | 10-2006-0091904| 8/2006 |

\* cited by examiner

*Primary Examiner*—Khanh C Tran

(57) ABSTRACT

A demodulator and a demodulating method for a WPAN are provided. In the demodulator for estimating a demodulation value of a received signal by correlating a PN code sequence of PN code having a periodic relationship for each code with a sample of the received signal, an IF processor unit separates the received signal to select only an imaginary part of the received signal, and digitalizes the selected imaginary part of the received signal. A differentiator unit delays the received signal outputted from the IF processor unit by preset delay time, and multiplies the delayed received signal by a current received signal to output a plurality of differentiated received signals. A conjugate unit sequentially stores samples of the imaginary parts of the differentiated received signals, and calculates correlation values by correcting the stored samples with PN coded sequences. A timing estimator unit receives the differentiated received signals and controls an operating timing of the conjugate unit. A demodulation value estimator unit stores the correlation values outputted from the conjugate unit and estimates the symbol of the PN code sequence corresponding to a maximum correlation value as the demodulation value of the received signal.

8 Claims, 4 Drawing Sheets

DEMODULATOR AND DEMODULATING METHOD FOR WPAN

CROSS-REFERENCE TO RELATED APPLICATIONS

This application claims the benefit of Korean Patent Application No. 10-2006-0064414 filed with the Korea Intellectual Property Office on Jul. 10, 2006, the disclosure of which is incorporated herein by reference.

BACKGROUND OF THE INVENTION

1. Field of the Invention

The present invention relates to a demodulator and a demodulating method for a Wireless Personal Area Network (WPAN), and more particularly, to a demodulator for a WPAN, which can decrease a circuit size by reducing an operation process of estimating a symbol of a received signal, and a demodulating method for the same.

2. Description of the Related Art

Recently, "ubiquitous" communication environment is proposed which can allow users to access a network at any time and at any place. Many studies have been actively conducted on small-scale wireless communication systems, e.g., Wireless Personal Area Network (WPAN), Ubiquitous Sensor Network (USN), Radio Frequency Identification (RFID), etc., rather than on a cellular network and a large-scale communication network.

In particular, communication performance, ultra miniaturization, low price, and low power consumption are critical factors in the fields of WPAN and USN. Such a wireless communication system, however, has difficulties in employing high-performance and expensive components used in the conventional cellular communication system or WPAN without any modification. Meanwhile, a large frequency error or phase error may be generated when cheap components are used so as to reduce the price of the wireless communication system. Therefore, there is a demand for an apparatus and method for solving such error problems.

Under these circumstances, researches have been conducted on a demodulator that can exhibit an excellent performance in communication system environments having a large frequency error and phase error.

A conventional demodulator for a WPAN will be described below with reference to FIGS. 1 to 4.

Figure 1:
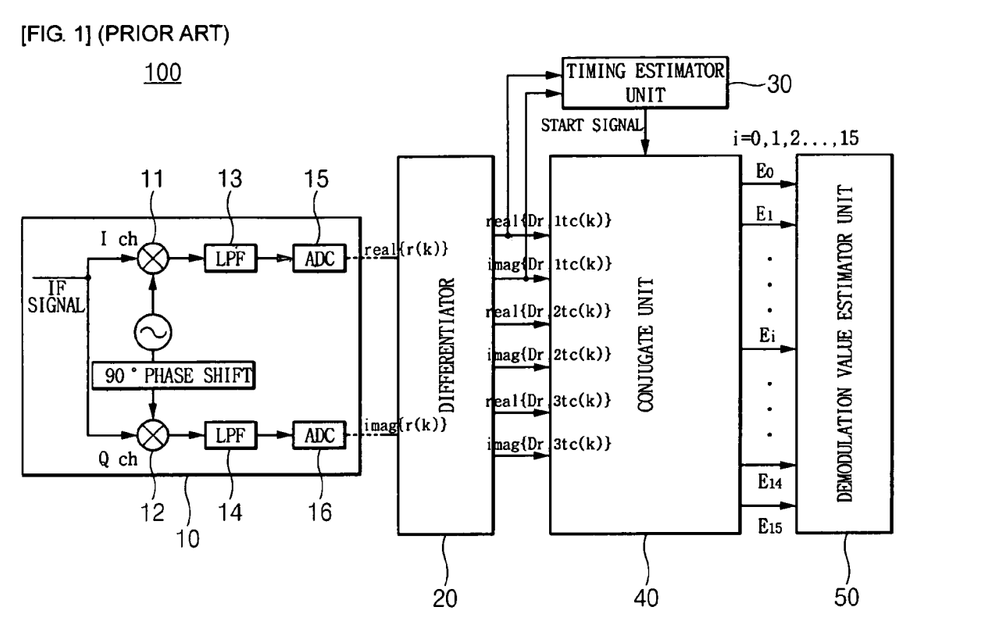
FIG. 1 is a block diagram of a conventional demodulator.
Figure 2:
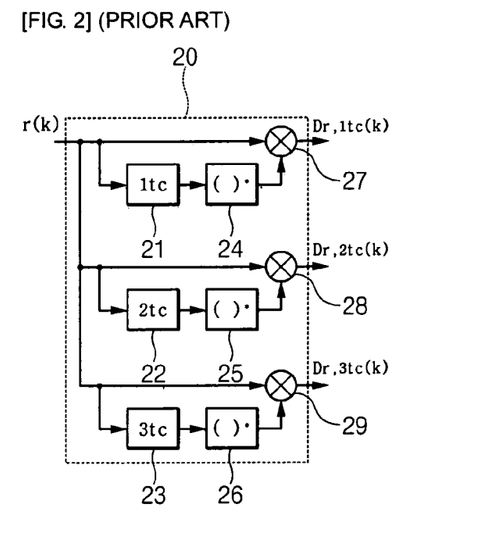
FIG. 2 is a circuit diagram of a differentiator unit illustrated in FIG. 1.
Figure 3:
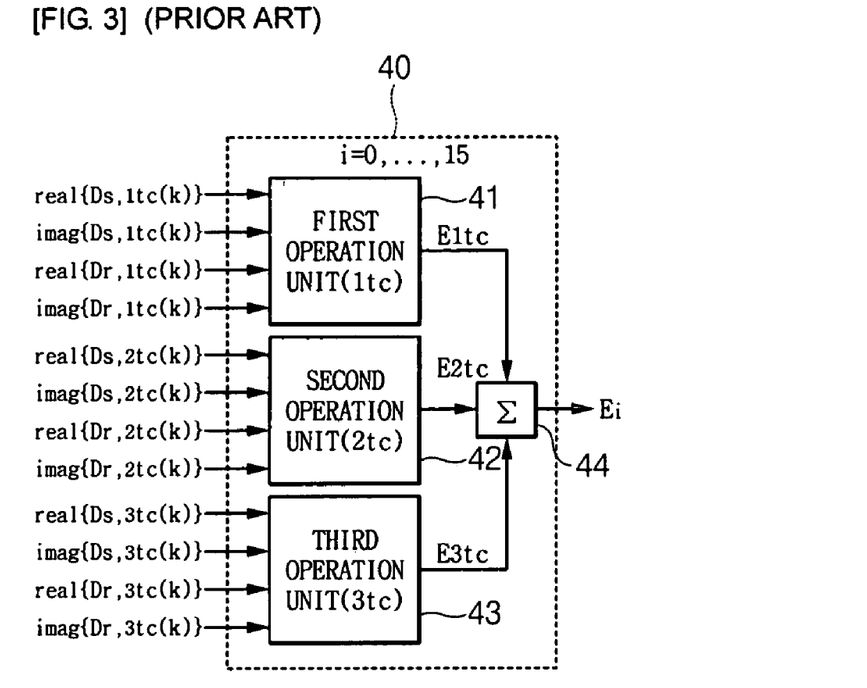
FIG. 3 is a circuit diagram of a conjugate unit illustrated in FIG. 1.
Figure 4:
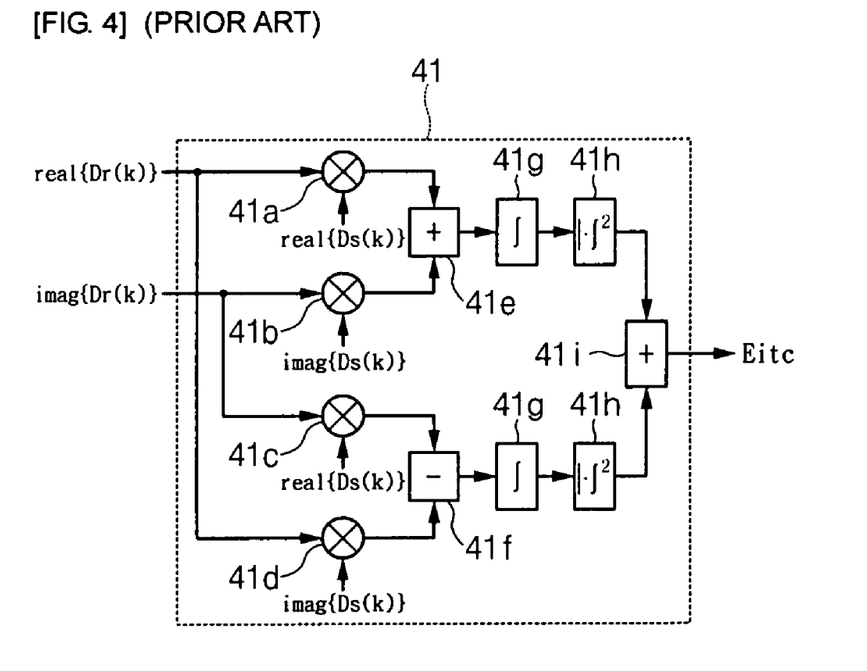
FIG. 4 is a circuit diagram of an operation unit illustrated in FIG. 1.

FIG. 1 is a block diagram of a conventional demodulator, FIG. 2 is a circuit diagram of a differentiator unit illustrated in FIG. 1, FIG. 3 is a circuit diagram of a conjugate unit illustrated in FIG. 1, and FIG. 4 is a circuit diagram of an operation unit illustrated in FIG. 1.

Referring to FIG. 1, the conventional demodulator 100 includes a differentiator unit 20, a timing estimator unit 30, a conjugate unit 40, and a demodulation value estimator unit 50. The differentiator unit 20 receives a signal consisting of a real part and an imaginary part from an IF processor unit 10 of a receiver and differentiates the received signal through multiple delays. The timing estimator unit 30 estimates a timing to acquire symbol and packet synchronization with respect to the received signal. The conjugate unit 40 obtains correlation values by performing an operation between the differentiated signal and a PN code sequence corresponding to sixteen symbols in response to a start signal of the timing estimator unit 30. The demodulation value estimator unit 50 compares the correlation values to obtain a maximum correlation value, and determines a PN code sequence corresponding to the obtained maximum correlation value as a symbol of the received signal.

More specifically, the received signal is frequency-converted into an IF signal at an RF stage (not shown) of the receiver, and is separated into a real part and an imaginary part of a baseband through mixers 11 and 12 of the IF processor unit 10. Then, the real part and the imaginary part of the received signal are filtered by low pass filters (LPFs) 13 and 14, respectively.

The received signal filtered by the low pass filters 13 and 14 is sampled by analog-to-digital converters (ADC) 15 and 16 and is applied to the differentiator unit 20 in the digital form. At this point, the IF signal, instead of the baseband signal, can be directly sampled by the ADCs 15 and 16 and then converted into the baseband signal.

The received signal r(k) that is IF-processed and inputted to the converter is a complex signal having a real part real{r(k)} and an imaginary part imag{r(k)}, where k represents a received packet sequence.

Then, the baseband digital signals real{r(k)} and imag{r(k)} are demodulated. First, the differentiator unit 20 calculates a differentiation value by complex-multiplying a current received signal by a received signal delayed by preset time $1tc$, $2tc$ and $3tc$.

Referring to FIG. 2, the differentiator unit 20 includes delayers 21, 22 and 23 respectively having preset delay time $1tc$, $2tc$ and $3tc$, and multipliers 27, 28 and 29. The delayers 21, 22 and 23 delay the received signal r(k) inputted from the IF processor unit 10. The multipliers 27, 28 and 29 obtain differentiated signals by multiplying the current received signal by the signals delayed by the delay time $1tc$, $2tc$ and $3tc$.

Conjugates 24, 25 and 26 represent that a sign of an imaginary part is converted because the received signal is a complex signal, and a multiplication on the complex signals is performed. Therefore, the differentiator unit 20 outputs three differentiation signals $Dr,1tc(k)$, $Dr,2tc(k)$ and $Dr,3tc(k)$ having different delay values.

The timing estimator unit 12 calculates symbol synchronization and packet synchronization using the signal $Dr,1tc(k)$ differentiated by the minimum delay among the output signals of the differentiator unit 20, and outputs a start signal indicating a detecting start of the conjugate unit 40.

The conjugate unit 40 starting its operation in response to the start signal received from the timing estimator unit 12 calculates correlation values by performing an operation on a plurality of differentiated received signals and a differentiated PN code sequence.

Referring to FIG. 3, the conjugate unit 40 includes first to third operation units 41, 42 and 43 and an adder 44. The first to third operation units 41, 42 and 43 perform a complex operation on the received signals differentiated at each delay time $1tc$, $2tc$ and $3tc$ and the PN code sequence differentiated in the same way. The adder 44 calculates a correlation value Ei (where i is a natural number ranging from 0 to 15 and represents a corresponding symbol) by summing complex-number operation values outputted from the first to third operation units 41, 42 and 43.

The first to third operation units 41, 42 and 43 complex-multiplies the plurality of differentiated signals $Dr,1tc(k)$, $Dr,2tc(k)$ and $Dr,3tc(k)$ outputted from the differentiator 20 by the differentiated signals $Ds,1tc(k)$, $Ds,2tc(k)$ and $Ds,3tc(k)$ of the PN code sequence of the corresponding symbol differentiated in the same way.

The PN code sequence used herein is shown in Tables 1 and 2. Table 1 shows 16 PN code sequences for real axis, and Table 2 shows 16 PN code sequences for imaginary axis. In Table 2, "2" represents "−1".

TABLE 1

PN Code Sequence

| SYMBOL | Samples of Real Axis (Real s0 s1 . . . s62 s63) |
|---|---|
| 0  | 0000010000000000100000101000000101010100000100010001010001001 |
| 1  | 0001000100001000000000100000101000000010101010000010001000101 |
| 2  | 0100010100010001000001000000000010000010100000001010100000100 |
| 3  | 0000010001000101000100001000000000001000010100000001010101 |
| 4  | 0101010100001000100010100010001000001000000000010000010101000000 |
| 5  | 0100000010101010000010001000101000100010000010000000000010000001 |
| 6  | 0100001010000000101010100000100010001010001000100001000000000000 |
| 7  | 0000000001000010100000001010101000001000100010100010001000100000100 |
| 8  | 0000010000000000100000101000000101010100000100010100010001 |
| 9  | 0001000100001000000000100000101000000010101010000010001000101 |
| 10 | 0100010100010001000001000000000010000010100000001010100000100 |
| 11 | 0000010001000101000100001000000000001000010100000001010101 |
| 12 | 0101010100001000100010100010001000001000000000010000010101000000 |
| 13 | 0100000010101010000010001000101000100010000010000000000010000001 |
| 14 | 0100001010000000101010100000100010001010001000100001000000000000 |
| 15 | 0000000001000010100000001010101000001000100010100010001000100000100 |

TABLE 2

PN Code Sequence

| SYMBOL | Samples of Imaginary Axis (Real s0 s1 . . . s62 s63) |
|---|---|
| 0  | 11111022222222220111110201111111020102011110222011102011102220 |
| 1  | 11102220111110222222222201111102011111110201020111110222011110220 |
| 2  | 20111020111022201111102222222222011111020111111102010201111111022 |
| 3  | 11111022201110201110222011110222222222220111110201111111020102010 |
| 4  | 10201020111110222011102011102220111110222222222220111111020111111 |
| 5  | 20111111102010201111102220111020111022201111102222222222201111110 |
| 6  | 20111110201111111020102011110222011102011102220111110222222222220 |
| 7  | 22222222201111102011111110201020111110222011102011102220111111022 |
| 8  | 22222011111111111022222201022222220102010222201110222010222011200 |
| 9  | 22201110222220111111111102222201022222220102010222201110222022 |
| 10 | 22222011102220102220110222220111111111102222201022222220102010 |
| 11 | 2010201022222201110222010222011102222201111111111022222010222222 |
| 12 | 1022222201020102222201110222010222011102222201111111110222222 |
| 13 | 1022222010222222201020102222201110222010222011102222201111111111 |

TABLE 2-continued

PN Code Sequence

Samples of Imaginary Axis
SYMBOL (Real s0 s1 . . . s62 s63)

14   0100000101000000010101010000010001000101000100010000010000000000

15   1111111110222220102222222010201022222011022201022201110222222011

Referring to FIG. 4, the first operation unit 41 includes first to fourth multipliers 41a, 41b, 41c and 41d, a first adder 41e, a subtractor 41f, two integrators 41g, two square operators 41h, and a second adder 41i. The first multiplier 41a multiplies the real part real{Dr(k)} of the differentiated received signal Dr(k) by the real part real{Ds(k)} of the differentiated PN code sequence Ds(k), and the second multiplier 41b multiplies the imaginary part imag{Ds(k)} of the differentiated received signal Dr(k) by the imaginary part imag{(Ds(k)) of the differentiated PN code sequence Ds(k). The third multiplier 41c multiplies the imaginary part imag{Dr(k)} of the differentiated received signal Dr(k) by the real part real{Ds(k)} of the differentiated PN code sequence Ds(k), and the fourth multiplier 41d multiplies the real part real{Dr(k)} of the differentiated received signal Dr(k) by the imaginary part imag{Ds(k)} of the differentiated PN code sequence Ds(k). The first adder 41e adds outputs of the first and second multipliers 41a and 41b, and the subtractor 41f subtracts outputs of the third and fourth multipliers 41c and 41d. The two integrators 41g integrate outputs of the first adder 41e and the subtractor 41f, respectively. The two square operators 41h square outputs of the two integrators 41g. The second adder 41i adds outputs of the two square operators 41h to output a correlation value Eitc. The second and third operation units 42 and 43 have the same structure as that of the first operation unit 41.

That is, when the complex-number multiplication is performed on the differentiated received signals and the differentiated PN code sequence, four results are outputted from the first to fourth multipliers 41a, 41b, 41c and 41d. The multiplication result during one symbol period is integrated by the integrator 41g, and the real part and the imaginary part are squared and added, thereby obtaining the final output value Eitc.

The adder 44 obtains the correlation result between the received signal and the symbols of the PN code sequence by summing the correlation values E1tc, E2tc and E3tc for each delay value, which are outputted from the first to third operation units 41, 42 and 43.

The demodulation value estimator unit 50 detects a maximum correlation value by comparing the correlation results outputted from the conjugate unit 40, and estimates the symbol of the PN code sequence corresponding to the maximum correlation value as the demodulation value of the received signal r(k).

Since the differentiator 20 is used, the conventional demodulator 100 can compensate a large frequency error and phase error. However, the process of operating the correlation results in the conjugate unit 40 is complicated, and thus the circuit size increases in system implementation.

Further, since the conventional demodulator 100 must operate the received signal with respect to the 16 PN code sequences and perform the square operation many times, an amount of calculation increases, and thus a square loss of a signal to noise ratio occurs. Therefore, a whole symbol detection performance is degraded.

SUMMARY OF THE INVENTION

An advantage of the present invention is that it provides a demodulator and a demodulating method for a WPAN, in which when a correlation value is calculated, an operation process of a conjugate unit is reduced, thereby decreasing the circuit size of the demodulator.

Additional aspects and advantages of the present general inventive concept will be set forth in part in the description which follows and, in part, will be obvious from the description, or may be learned by practice of the general inventive concept.

According to an aspect of the invention, there is provided a demodulator for estimating a demodulation value of a received signal by correlating a PN code sequence of PN code having a periodic relationship for each code with a sample of the received signal. The demodulator includes: an IF processor unit separating the received signal to select only an imaginary part of the received signal, and digitalizing the selected imaginary part of the received signal; a differentiator unit delaying the received signal outputted from the IF processor unit by preset delay time, and multiplying the delayed received signal by a current received signal to output a plurality of differentiated received signals; a conjugate unit sequentially storing samples of the imaginary parts of the differentiated received signals, and calculating correlation values by correcting the stored samples with PN coded sequences; a timing estimator unit receiving the differentiated received signals and controlling an operating timing of the conjugate unit; and a demodulation value estimator unit storing the correlation values outputted from the conjugate unit and estimating the symbol of the PN code sequence corresponding to a maximum correlation value as the demodulation value of the received signal.

The IF processor unit may include: a mixer receiving an external analog signal and separating only an imaginary part of the received signal; a low pass filter filtering the imaginary part of the received signal separated by the mixer; and an analog-to-digital converter digitalizing the imaginary part of the received signal filtered by the low pass filter.

The conjugate unit may include: a shift register sequentially storing the samples of the received signal differentiated by the differentiator unit; a buffer storing the samples of signals until a preamble of the signals received after the stored received signal is found; a correlator including a plurality of correlator circuits correlating the samples of the received signal stored in the shift register with the samples of the PN code sequence; and an adder summing the correlation values of the correlator to output the correlation result.

The correlator may use a 0-th PN code sequence.

According to another aspect of the present invention, there is provided a demodulating method for estimating a demodulation value of a received signal by correlating a PN code sequence of PN code having a periodic relationship for each code with a sample of the received signal. The demodulating method includes: a) digitalizing only an imaginary part of an external analog signal; b) delaying and differentiating the digitalized received signal; c) sequentially storing samples of the imaginary part of the differentiated received signal, and calculating correlation values by correcting the stored samples with PN coded sequences; d) storing the correlation values calculated in the operation a) and estimating the symbol of the PN code sequence corresponding to a maximum correlation value as the demodulation value of the received signal.

The operation a) may include: a-1) receiving the external analog signal and separating only an imaginary part of the received signal; a-2) filtering the imaginary part of the received signal separated in the operation a-1); and a-3) digitalizing the imaginary part of the received signal filtered in the operation a-2).

The operation c) may include: c-1) sequentially storing the samples of the differentiated received signal; c-2) storing the samples of signals until a preamble of the signals received after the stored received signal is found; and c-3) correlating the samples of the received signal sequentially stored in the operation c-1) with the samples of the PN code sequence.

The operation c-3) may use a 0-th PN code sequence to correlate the imaginary part of the received signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, a demodulator for a WPAN according to an embodiment of the present invention will be described with reference to the accompanying drawings.

Figure 5:
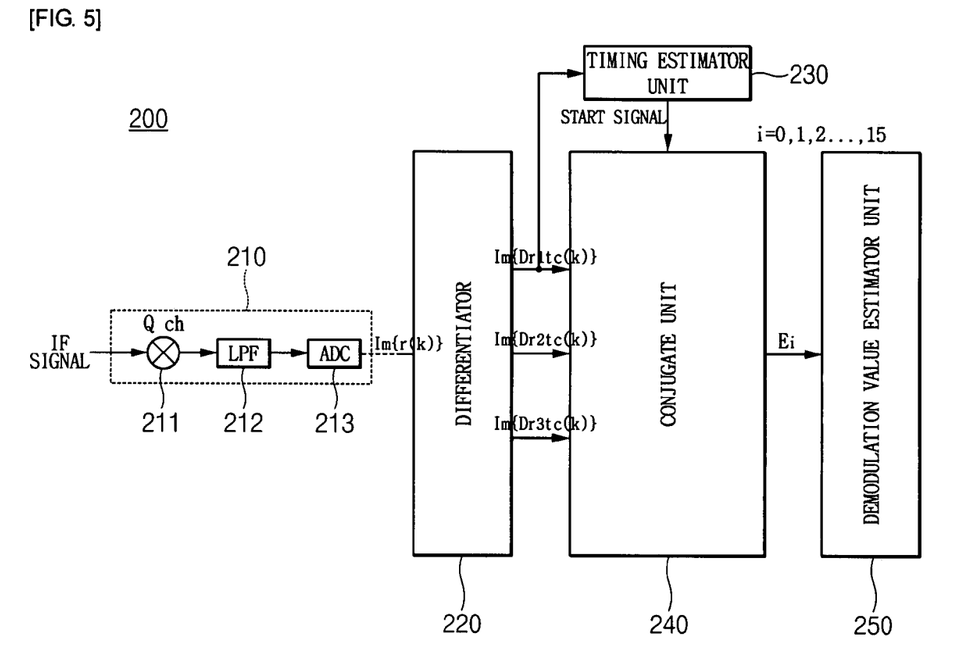
FIG. 5 is a block diagram of a demodulator for a WPAN according to an embodiment of the present invention.
Figure 6:
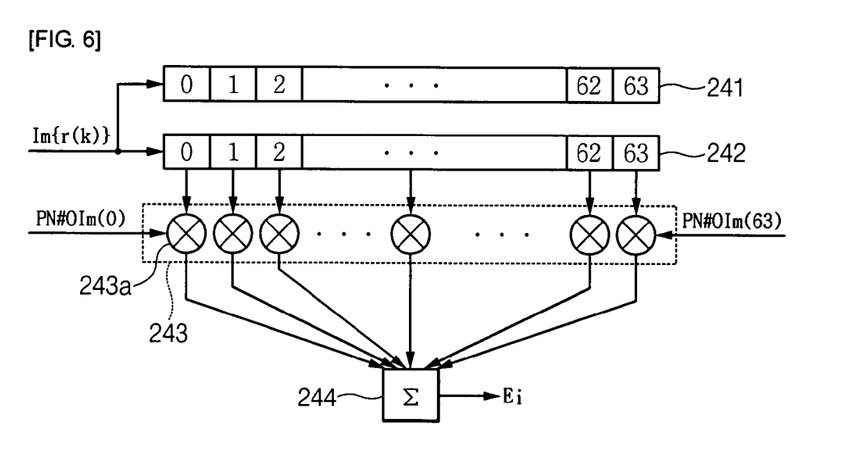
FIG. 6 is a circuit diagram of a conjugate unit illustrated in FIG. 5.
Figure 7:
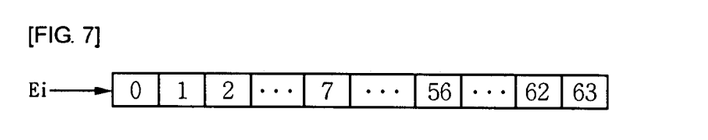
FIG. 7 is a circuit diagram of a demodulation value estimator unit illustrated in FIG. 5.

FIG. 5 is a block diagram of a demodulator for a WPAN according to an embodiment of the present invention, FIG. 6 is a circuit diagram of a conjugate unit illustrated in FIG. 5, and FIG. 7 is a circuit diagram of a demodulation value estimator unit illustrated in FIG. 5.

Referring to FIG. 5, the demodulator 200 for the WPAN according to an embodiment of the present invention includes an IF process unit 210, a differentiator unit 220, a timing estimator unit 230, a conjugate unit 240, and a complex number estimator unit 250.

A received signal is frequency-converted into an IF signal at an RF stage (not shown) of a receiver. A mixer 211 of the IF processor unit 210 separates the IF signal into an imaginary-part baseband signal. The received signal having only the imaginary part is filtered by a low pass filter (LPF) 212. The filtered received signal is sampled by an ADC 213 and applied to the differentiator unit 220 in the digital form.

At this point, the IF signal, instead of the baseband signal, can be directly sampled by the ADCs 15 and 16 and then converted into the baseband signal.

The received signal r(k) processed by the IF processor unit 210 is a complex signal having only an imaginary part Im{r(k)}, where k represents a received packet sequence.

Then, the baseband digital signal Im{r(k)} is demodulated. First, the differentiator unit 220 calculates a differentiation value by complex-multiplying a current received signal by a received signal delayed by preset time 1tc, 2tc and 3tc.

The timing estimator unit 230 calculates symbol synchronization and packet synchronization using the signal Dr,1tc (k) differentiated by a minimum delay among the output signals of the differentiator unit 220, and outputs a start signal indicating a detection start of the conjugate unit 240. The conjugate unit 240 starts to operate in response to the start signal inputted from the timing estimator unit 230.

The conjugate unit 240 is connected to the IF processor unit 210 and calculates correlation values by performing an operation on the imaginary part Im{r(k)} of the received signal and the PN code sequence. In order to explain the present invention more clearly, a 0-th PN code sequence among the PN code sequences will be used.

Referring to FIG. 6, the conjugate unit 240 includes a buffer 241, a shift register 242, and a correlator 223. The shift register 242 sequentially stores the samples of the imaginary part Im{r(k)} of the received signal differentiated by the differentiator 220. The buffer 241 stores the samples of the received signal until a preamble is found. The preamble is a signal indicating a start of the received signal after the received signal stored in the shift register 242. The correlator 223 includes a plurality of correlator circuits for correlating the samples of the imaginary part Im{r(k)} of the received signal stored in the shift register and the samples of the 0-th PN code sequence.

More specifically, the shift register 242 is implemented with 64 memories for storing the samples, the number of which is identical to that of the PN codes. The shift register 242 stores the samples while shifting right until the preamble of the imaginary part Im{r(k)} of the differentiated received signal is stored in a sixty-third memory.

When the received signals are stored in the 64 memories of the shift register 242, the received signals applied from the differentiator unit 220 are stored in the buffer 241. The buffer 241 stores the received signals while shifting right until the preamble is stored in the sixty-third memory. The shift register 242 performs a cyclic shift right together with the buffer 241.

When the shift register 242 and the buffer 241 store the received signals while shifting right, the correlator 243 correlates the imaginary parts of the received signals stored in the memories and the 0-th PN code sequence. For example, when one received signal sample is applied after the shift register 242 stores the received signals, the received signal sample is stored in a first memory of the buffer 241, and the memories of the shift register 242 are shifted right so that the sample stored in the sixty-fourth memory is stored in the first memory and the sample stored in the first memory is stored in the second memory.

The correlator 243 correlates the shifted and stored samples and the 0-th PN code sequence having the 64 samples. The adder 244 sums the correlated output values to output the correlation value Ei. At this point, the correlator 243 includes 64 correlator circuits 243a for correlating the 64 samples.

Meanwhile, the reason why the imaginary part of the received signal is correlated with only the 0-th PN code sequence is that the first PN code sequence is cyclic-shifted-right with an 8-bit difference from the 0-th PN code sequence, as can be seen from Table 2.

In addition, the second PN code sequence is cyclic-shifted-right with an 8-bit difference from the first PN code sequence, and the 0-th to seventh PN code sequences are cyclic-shifted-right with the 8-bit difference. Therefore, the first to seventh PN code sequences can be implemented based on the 0-th PN code sequence.

Eighth to fifteenth PN code sequences are complement of the 0-th to seventh PN code sequences. Therefore, when the correlation values are negative, they can be determined as the eighth to fifteenth PN code sequences.

Under the same principle, the demodulation value estimator unit 250 stores 64 correlation values Ei while shifting right the shift register 242 when the 64 samples of the received signals are stored in the buffer 241. Then, the demodulation value estimator unit 250 selects the memory storing the maximum correlation value and estimates the symbol of the corresponding PN code sequence as the symbol of the received signal.

The reason why the memory storing the maximum correlation value is selected is as follows. In case where the sample of the received signal is correlated with the samples of the 0-th PN code sequence, if they coincide with each other, the value of the received signal is stored in the memory corresponding to "1" of the 0-th PN code sequence. Therefore, when they are correlated, the correlation value having a magnitude can be obtained. If they doe not coincide with each other, any value is not outputted. Consequently, 0 is outputted as the correlation value.

Referring to FIG. 7, if the maximum correlation value is stored in the eighth memory, the symbol of the first PN code sequence is the demodulation value of the received signal. If the maximum correlation value is stored in a fifty-sixth memory, the symbol of the seventh PN code sequence is the demodulation value of the received signal.

In the demodulation value estimator unit 250, if the correlation value stored in the eighth memory is negative, the symbol of the ninth PN code sequence is the demodulation value of the received signal. If the correlation value stored in the fifty-sixth memory is negative, the symbol of the fifteenth PN code sequence is the demodulation value of the received signal.

At this point, the correlation value can have a desired negative value when the eighth to fifteenth PN code sequences have a phase of 180°. However, the eighth to fifteenth PN code sequences have 0° and 180° at the same time. In addition to the negative value corresponding to 180°, the positive value corresponding to 0° exists. Therefore, the correlation values of the eighth to fifteenth code sequences have −34 less than 60 that are correlation values of the 0-th to seventh PN code sequences, as can be seen from Table 3. Table 3 shows the correlation values when 64 PN code sequences are all used.

TABLE 3

| Symbol | Correlation Value |
| --- | --- |
| 0 | 60 |
| 1 | 60 |
| 2 | 60 |
| 3 | 60 |
| 4 | 60 |
| 5 | 60 |
| 6 | 60 |
| 7 | 60 |
| 8 | −34 |
| 9 | −34 |
| 10 | −34 |
| 11 | −34 |
| 12 | −34 |
| 13 | −34 |
| 14 | −34 |
| 15 | −34 |

At this point, using the fact that the codes corresponding to 0° is small in the PN code sequences, the correlation value having a relatively low absolute value than the 0-th to seventh PN code sequences can be recovered by removing "0" code corresponding to 0° among the 0-th PN code sequences. Although the correlation values of the 0-th to seventh PN code sequences decrease, the performance will be excellent.

Table 4 shows the correlation values when the codes corresponding to 0° are removed. As can be seen from Table 4, when the codes corresponding to 0° are removed, the absolute values of the 0-th to fifteenth PN code sequences are 47.

TABLE 4

| Symbol | Correlation Value |
| --- | --- |
| 0 | 47 |
| 1 | 47 |
| 2 | 47 |
| 3 | 47 |
| 4 | 47 |
| 5 | 47 |
| 6 | 47 |
| 7 | 47 |
| 8 | −47 |
| 9 | −47 |
| 10 | −47 |
| 11 | −47 |
| 12 | −47 |
| 13 | −47 |
| 14 | −47 |
| 15 | −47 |

In addition, when the correlation is performed by removing the codes corresponding to 0° in Table 2, the 0-th PN code sequence in Table 1 always have 0 because the samples having 1 are all removed. Therefore, the demodulation values can be estimated using only the imaginary axis, without using the real axis.

Therefore, as described above, the demodulator 200 for the WPAN according to the present invention can recognize the regularity of the PN codes and reduce the operation procedures of the conjugate unit 420, thereby reducing the circuit size.

A demodulation method of a WPAN will be described below with reference to FIG. 8.

Figure 8:
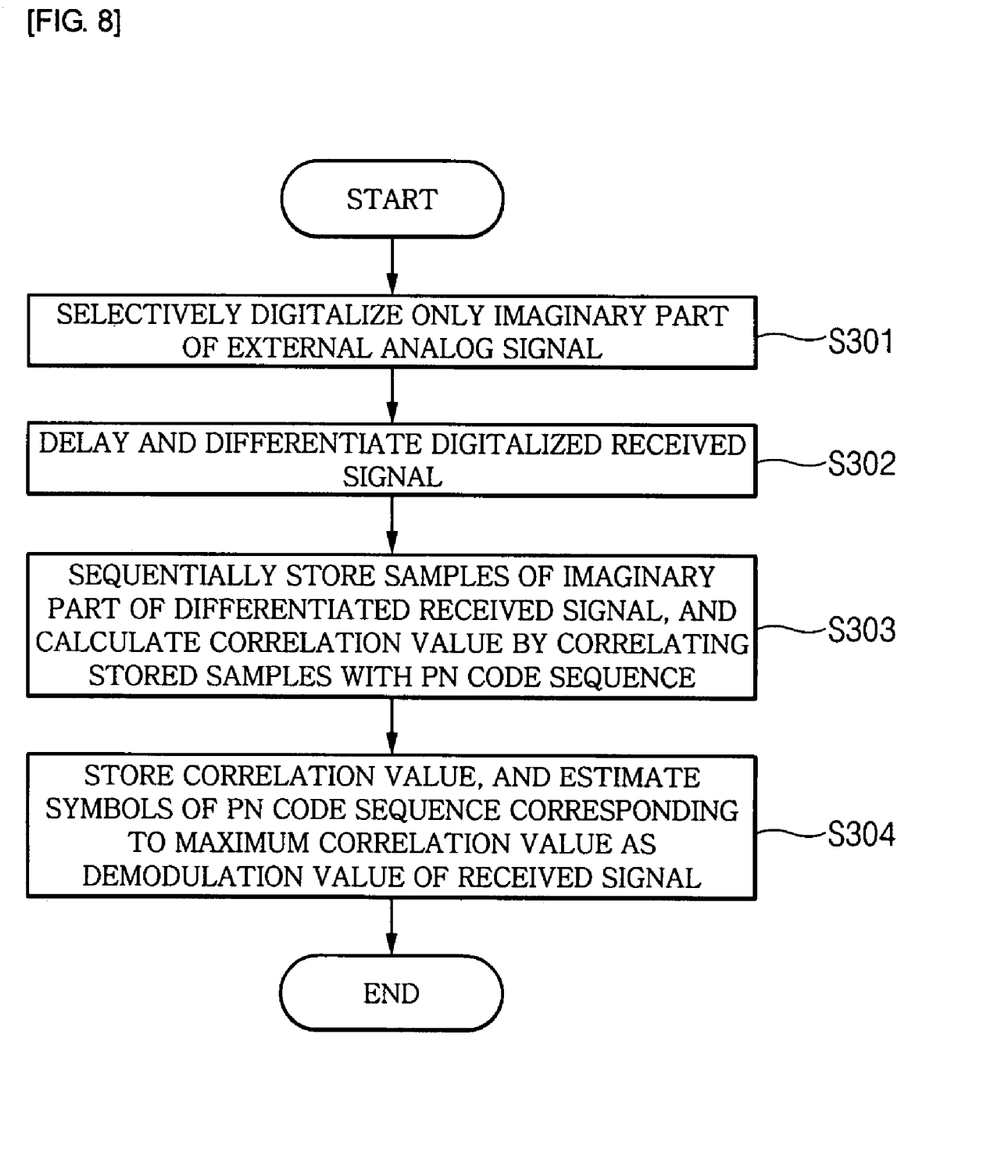
FIG. 8 is a flowchart illustrating a demodulating method of a WPAN according to an embodiment of the present invention.

FIG. 8 is a flowchart illustrating a demodulating method of a WPAN according to an embodiment of the present invention.

Referring to FIG. 8, in operation S301, an external analog signal is received, and only an imaginary part of the analog signal is selected and digitalized.

The operation S301 includes an operation S301-1 of selectively separating only the imaginary part from the received signal, an operation S301-2 of filtering the imaginary part of the received signal, and an operation S301-3 of digitalizing the filtered imaginary part of the received signal.

In operation S302, the digitalized received signal is delayed and differentiated.

In operation S303, the samples of the imaginary part of the differentiated received signal are sequentially stored, and the stored samples and the PN code sequences are correlated with each other to obtain the correlation values.

The operation S303 includes an operation S303-1 of sequentially storing the samples of the differentiated received signal, an operation S303-2 of storing the samples of the signals until a preamble of a signal received after the stored received signal in the operation S303-1 is found, and an operation S303-3 of correlating the samples of the received signals sequentially stored in the operation S303-2 and the samples of the PN code sequence.

In particular, in the operation S303-3, the PN code sequence correlated with the imaginary part of the received signal is the 0-th PN code sequence.

In operation S304, the correlation values obtained in the operation S303 are stored, and the symbol of the PN code sequence corresponding to the maximum correlation value among the stored correlation values is estimated as the demodulation value of the received signal.

As described above, the demodulator and the demodulation method for the WPAN uses only the imaginary part of the received signal due to the PN code regularity having the periodic relationship for each code. Therefore, the operation procedures and complexity of the conjugate unit can be reduced. Consequently, the circuit size of the demodulator for the WPAN can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A demodulator for estimating a demodulation value of a received signal by correlating a PN code sequence of PN code having a periodic relationship for each code with a sample of the received signal, the demodulator comprising:
    an IF processor unit separating the received signal to select only an imaginary part of the received signal, and digitalizing the selected imaginary part of the received signal;
    a differentiator unit delaying the received signal outputted from the IF processor unit by preset delay time, and multiplying the delayed received signal by a current received signal to output a plurality of differentiated received signals;
    a conjugate unit sequentially storing samples of the imaginary parts of the differentiated received signals, and calculating correlation values by correcting the stored samples with PN coded sequences;
    a timing estimator unit receiving the differentiated received signals and controlling an operating timing of the conjugate unit; and
    a demodulation value estimator unit storing the correlation values outputted from the conjugate unit and estimating the symbol of the PN code sequence corresponding to a maximum correlation value as the demodulation value of the received signal.

2. The demodulator according to claim 1, wherein the IF processor unit includes:
    a mixer receiving an external analog signal and separating only an imaginary part of the received signal;
    a low pass filter filtering the imaginary part of the received signal separated by the mixer; and
    an analog-to-digital converter digitalizing the imaginary part of the received signal filtered by the low pass filter.

3. The demodulator according to claim 1, wherein the conjugate unit includes:
    a shift register sequentially storing the samples of the received signal differentiated by the differentiator unit;
    a buffer storing the samples of signals until a preamble of the signals received after the stored received signal is found;
    a correlator including a plurality of correlator circuits correlating the samples of the received signal stored in the shift register with the samples of the PN code sequence; and
    an adder summing the correlation values of the correlator to output the correlation result.

4. The demodulator according to claim 3, wherein the correlator uses a 0-th PN code sequence.

5. A demodulating method for estimating a demodulation value of a received signal by correlating a PN code sequence of PN code having a periodic relationship for each code with a sample of the received signal, the demodulating method comprising:
    a) digitalizing only an imaginary part of an external analog signal;
    b) delaying and differentiating the digitalized received signal;
    c) sequentially storing samples of the imaginary part of the differentiated received signal, and calculating correlation values by correcting the stored samples with PN coded sequences;
    d) storing the correlation values calculated in the operation c) and estimating the symbol of the PN code sequence corresponding to the maximum correlation value as the demodulation value of the received signal.

6. The demodulating method according to claim 5, wherein the operation a) includes:
    a-1) receiving the external analog signal and separating only an imaginary part of the received signal;
    a-2) filtering the imaginary part of the received signal separated in the operation a-1); and
    a-3) digitalizing the imaginary part of the received signal filtered in the operation a-2).

7. The demodulating method according to claim 5, wherein the operation c) includes:
    c-1) sequentially storing the samples of the differentiated received signal;
    c-2) storing the samples of signals until a preamble of the signals received after the stored received signal is found; and
    c-3) correlating the samples of the received signal sequentially stored in the operation c-1) with the samples of the PN code sequence.

8. The demodulating method according to claim 7, wherein the operation c-3) uses a 0-th PN code sequence to correlate the imaginary part of the received signal.

* * * * *